(12) United States Patent
Ichimura et al.

(10) Patent No.: US 10,748,713 B2
(45) Date of Patent: Aug. 18, 2020

(54) SEPARATOR FOR ELECTROCHEMICAL DEVICE AND ELECTROCHEMICAL DEVICE

(71) Applicant: NIPPON KODOSHI CORPORATION, Kochi-shi (JP)

(72) Inventors: Takumi Ichimura, Kochi (JP); Norihiro Wada, Kochi (JP); Gaku Matsuoka, Kochi (JP); Atsushi Igawa, Kochi (JP)

(73) Assignee: NIPPON KODOSHI CORPORATION, Kochi-shi (JP)

( * ) Notice: Subject to any disclaimer, the term of this patent is extended or adjusted under 35 U.S.C. 154(b) by 174 days.

(21) Appl. No.: 15/760,716

(22) PCT Filed: Sep. 27, 2016

(86) PCT No.: PCT/JP2016/078401
§ 371 (c)(1),
(2) Date: Mar. 16, 2018

(87) PCT Pub. No.: WO2017/057335
PCT Pub. Date: Apr. 6, 2017

(65) Prior Publication Data
US 2018/0261392 A1 Sep. 13, 2018

(30) Foreign Application Priority Data

Sep. 29, 2015 (JP) ................................ 2015-190549

(51) Int. Cl.
*H01G 9/02* (2006.01)
*H01G 11/52* (2013.01)
(Continued)

(52) U.S. Cl.
CPC ............... *H01G 9/02* (2013.01); *H01G 9/155* (2013.01); *H01G 11/52* (2013.01); *H01M 2/16* (2013.01);
(Continued)

(58) Field of Classification Search
CPC .......... H01G 9/02; H01G 9/155; H01G 11/52; H01M 2/16; H01M 2/1606; H01M 2/1673;
(Continued)

(56) References Cited

U.S. PATENT DOCUMENTS

| 6,104,600 A | 8/2000 | Suhara et al. |
| 2009/0325058 A1* | 12/2009 | Katayama ................ H01G 9/02 429/142 |

(Continued)

FOREIGN PATENT DOCUMENTS

| CN | 102356441 A | 2/2012 |
| EP | 0 933 790 A1 | 8/1999 |

(Continued)

OTHER PUBLICATIONS

International Search Report dated Dec. 20, 2016 in PCT/JP2016/078401 filed Sep. 27, 2016.

(Continued)

*Primary Examiner* — Jimmy Vo
(74) *Attorney, Agent, or Firm* — Oblon, McClelland, Maier & Neustadt, L.L.P.

(57) ABSTRACT

Provided is a separator for an electrochemical device, the separator having excellent denseness, resistance, and wettability by electrolytic solutions. A separator for an electrochemical device, the separator being interposed between a pair of electrodes and being capable of holding an electrolytic solution containing an electrolyte, wherein the separator for an electrochemical device comprises solvent-spun regenerated cellulose fibers in which the core portion has an average fiber diameter of 1-11 μm, the separator having a thickness of from 5 to 100 μm, a density of from 0.25 to 0.9 g/cm$^3$, and a curvature rate of from 1.5 to 15.

9 Claims, 1 Drawing Sheet

(51) Int. Cl.
*H01M 2/16* (2006.01)
*H01G 9/00* (2006.01)
*H01M 10/0525* (2010.01)

(52) U.S. Cl.
CPC ....... *H01M 2/1606* (2013.01); *H01M 2/1673* (2013.01); *H01M 2/1686* (2013.01); *H01M 10/0525* (2013.01); *Y02E 60/13* (2013.01)

(58) Field of Classification Search
CPC .......... H01M 2/1686; H01M 10/0525; H01M 2/1606
See application file for complete search history.

(56) References Cited

U.S. PATENT DOCUMENTS

| | | | |
|---|---|---|---|
| 2012/0003525 A1 | 1/2012 | Hashimoto et al. | |
| 2013/0280616 A1* | 10/2013 | Machii | H01M 2/16 429/249 |
| 2015/0010828 A1* | 1/2015 | Kubo | H01M 2/1626 429/246 |
| 2015/0280192 A1 | 10/2015 | Lee et al. | |

FOREIGN PATENT DOCUMENTS

| | | | |
|---|---|---|---|
| EP | 2 897 197 A1 | 7/2015 | |
| JP | 6-168848 A | 6/1994 | |
| JP | 8-273984 A | 10/1996 | |
| JP | 11-312507 A | 11/1999 | |
| JP | 11-322988 A | 11/1999 | |
| JP | 2000-3834 A | 1/2000 | |
| JP | 2000-331663 A | 11/2000 | |
| JP | 2008-124064 A | 5/2008 | |
| JP | 2009-158811 A | 7/2009 | |
| JP | 2010-53245 A | 3/2010 | |
| JP | 2011-192528 A | 9/2011 | |
| JP | 2011-210574 A | 10/2011 | |
| JP | 2012-221567 A | 11/2012 | |
| JP | 2014-53259 A | 3/2014 | |
| JP | 2015-162281 A | 9/2015 | |
| WO | WO-2013114949 A1 * | 8/2013 | .......... H01M 2/1686 |

OTHER PUBLICATIONS

Combined Chinese Office Action and Search Report dated Mar. 27, 2019 in corresponding Chinese Patent Application No. 201680056614.9 (with English Translation and English Translation of Category of Cited Documents), 13 pages.

Extended European Search Report dated Apr. 8, 2019 in corresponding European Patent Application No. 16851506.2, 8 pages.

* cited by examiner $\tau = l/L$ $\tau_1 = l_1/L > \tau_2 = l_2/L$ $\tau_2 = l_2/L > \tau_3 = l_3/L$

SEPARATOR FOR ELECTROCHEMICAL DEVICE AND ELECTROCHEMICAL DEVICE

TECHNICAL FIELD

The present invention relates to a separator for an electrochemical device and an electrochemical device including the separator. The present invention is suitable for separators for electrochemical devices and electrochemical devices, such as aluminum electrolytic capacitors, electric double layer capacitors, lithium ion capacitors, lithium primary batteries, and lithium-ion secondary batteries.

BACKGROUND ART

Typical examples of electrochemical devices include condensers, capacitors, and batteries. These electrochemical devices have recently been used in many fields, including automotive equipment, renewable energy-related equipment, such as wind power generation and photovoltaic power generation, and communication devices, such as smart meters. It is expected that the market will grow continuously.

There is a demand for electrochemical devices with further improved charge-discharge characteristics, output characteristics, and cycle life. As a means to satisfy the demand, it is effective to reduce the resistance of electrochemical devices. High resistance in charging or discharging results in an increased loss due to the resistance. The loss generates heat, which directly affects the life. Because less heat generation results in a longer life, there is a growing demand for lower resistance.

Various components, such as electrode materials and electrolytic solutions, are actively improved to reduce the resistance of electrochemical devices. There is also a strong demand for separators with lower resistance.

Main functions of separators in electrochemical devices are separation of electrode foils and holding of electrolytic solution. For separation of electrode foils, separators should have low resistance and denseness. Materials for separators need electrical insulating properties and require hydrophilicity and lipophilicity to hold various electrolytic solutions. Poor wettability of separators not only results in low productivity of electrochemical devices but also makes it difficult to hold an adequate amount of electrolytic solution, thus shortening the lives of the electrochemical devices.

Thus, separators for electrochemical devices need to have low resistance, denseness, and high wettability by electrolytic solutions.

Separators for electrochemical devices described below have been proposed (see Patent Literature 1 to Patent Literature 7, for example).

CITATION LIST

Patent Literature

PTL 1: Japanese Unexamined Patent Application Publication No. 2000-3834
PTL 2: Japanese Unexamined Patent Application Publication No. 2012-221567
PTL 3: Japanese Unexamined Patent Application Publication No. 8-273984
PTL 4: Japanese Unexamined Patent Application Publication No. 6-168848
PTL 5: Japanese Unexamined Patent Application Publication No. 2010-53245
PTL 6: Japanese Unexamined Patent Application Publication No. 11-312507
PTL 7: Japanese Unexamined Patent Application Publication No. 2015-162281

SUMMARY OF INVENTION

Technical Problem

In a method proposed in Patent Literature 1, beaten solvent-spun regenerated cellulose fibers are used to improve the denseness and to reduce the resistance of a separator. Beating of beatable solvent-spun regenerated cellulose fibers produces fine fibrils of less than 1 μm. Thus, separators formed of repeatedly beaten solvent-spun regenerated cellulose have denseness and microporous paper quality. Having electrical insulating properties, hydrophilicity, and lipophilicity, cellulose is a suitable material for separators for electrochemical devices. In recent years, however, there has been a demand for separators with further lower resistance.

In a separator proposed in Patent Literature 2, not only the degree of beating but also the fiber length after beating are specified to improve adhesion to electrolytic solutions. However, after an electrochemical device is impregnated with a electrolytic solution, such a separator can withstand deformation not accompanied by vigorous movements, such as thermal expansion and contraction, but is broken in a large movement process, such as a process of coiling the device.

A low-density paper proposed in Patent Literature 3 is produced with a cylinder paper machine to improve the internal resistance of an electrochemical device. However, the structure described in Patent Literature 3 has through-holes characteristic of the cylinder paper machine and may cause a short circuit in an electrochemical device.

A separator proposed in Patent Literature 4 is a two-layer separator composed of a high-density natural cellulose layer and a low-density natural cellulose layer in order to reduce the number of short circuits and to improve internal resistance.

In the separator described in Patent Literature 4, the natural cellulose layer with a high degree of beating is effective in reducing the short circuit rate. However, the separator described in Patent Literature 4 has higher internal resistance than the separator described in Patent Literature 1.

A polyolefin microporous film is proposed in Patent Literature 5. Polyolefin porous films have lower wettability and fewer voids than cellulose separators and therefore cannot hold sufficient electrolytic solutions, reduce ionic conduction of electrolytic solutions, and increase resistance. Furthermore, polyolefin microporous films have low heat resistance and therefore cannot resist the internal temperature rise of an electrochemical device caused by an increase in capacity and power of the electrochemical device.

A polyolefin melt-blown nonwoven fabric is proposed in Patent Literature 6. Melt-blown nonwoven fabrics have lower denseness than cellulose separators. Thus, melt-blown nonwoven fabrics need to have a certain thickness to ensure denseness. This increases the resistance of electrochemical devices and increases the size of electrochemical devices.

In a separator proposed in Patent Literature 7, the diameter of solvent-spun regenerated cellulose fibers is specified to decrease the thickness and to increase the mechanical strength of the separator. The separator contains synthetic fibers and natural fibers as essential components as well as the solvent-spun regenerated cellulose fibers. The separator holds less electrolytic solution and has higher resistance than separators composed only of solvent-spun regenerated cellulose, thus increasing the resistance of electrochemical devices and impairing the cycle characteristics of electrochemical devices.

Denseness and low resistance required for separators are mutually contradictory and are difficult to satisfy only by controlling the degree of beating, fiber length, and fiber diameter. Furthermore, the separators of the related art are used only in particular electrochemical devices and are not necessarily used in any electrochemical device.

In view of such problems, it is an object of the present invention to provide a separator that can solve such problems. More specifically, a separator according to the present invention is a separator for an electrochemical device and has high denseness, resistance, and wettability by electrolytic solutions. Such a separator for an electrochemical device can be used to provide an electrochemical device with low resistance, a low short circuit rate, high productivity, and long life.

Solution to Problem

The present invention includes the following constituents to solve the problems and achieve the object.

A separator for an electrochemical device, the separator being interposed between a pair of electrodes and being capable of holding an electrolytic solution containing an electrolyte, wherein the separator for an electrochemical device contains solvent-spun regenerated cellulose fibers having a core portion with an average fiber diameter in the range of 1 to 11 μm, the separator having a thickness in the range of 5 to 100 μm, a density in the range of 0.25 to 0.9 g/cm$^3$, and a curvature rate in the range of 1.5 to 15.

An electrochemical device including the separator for an electrochemical device.

The electrochemical device is an aluminum electrolytic capacitor, an electric double layer capacitor, a lithium ion capacitor, a lithium primary battery, or a lithium-ion secondary battery.

The present inventors found that the curvature rate of a separator correlates with resistance. The curvature rate is represented by the ratio of the ion flow path length of a gas or fluid in a separator to the thickness of the separator. A lower curvature rate results in a shorter path length and lower resistance. On the other hand, a higher curvature rate results in higher resistance but is effective in reducing the number of short circuits of an electrochemical device. Thus, the resistance and short circuit problems of electrochemical devices can be solved by controlling the curvature rate.

The curvature rate depends on the diameter of fibers constituting a separator. A larger fiber diameter or a flatter shape results in a higher curvature rate and higher resistance. Thus, even with the same degree of beating or the same fiber length, a separator with a larger core diameter has higher resistance.

In the present specification, a filament with a fiber diameter of less than 1 μm formed by beating is referred to as a "fibril", and the original fiber with a fiber diameter of 1 μm or more is referred to as a "core".

Advantageous Effects of Invention

The present invention can provide a separator for an electrochemical device, the separator having high denseness, resistance, and wettability by electrolytic solutions, by using solvent-spun regenerated cellulose fibers and by controlling the average fiber diameter after beating and the curvature rate of the separator. The separator can be used to provide an electrochemical device with a low short circuit rate, high productivity, and long life without adverse effects on resistance performance.

DESCRIPTION OF EMBODIMENTS

Embodiments of the present invention will be described in detail below with reference to the drawings.

The present embodiments, other examples, and tests and researches on various materials and compositions show that a separator with low resistance and high wettability by electrolytic solutions can be provided without losing the denseness of the separator when the separator is composed of solvent-spun regenerated cellulose fibers having a core portion with an average fiber diameter in the range of 1 to 11 μm, has a thickness in the range of 5 to 100 μm, a density in the range of 0.25 to 0.9 g/cm$^3$, and a curvature rate in the range of 1.5 to 15.

The separator is preferably formed by a paper-making method. Examples of the paper-making form include Fourdrinier paper-making, TANMO (short Fourdrinier) paper-making, cylinder paper-making, and combinations thereof.

Preferably, at least one layer is formed by Fourdrinier paper-making or TANMO (short Fourdrinier) paper-making to improve the denseness of a separator.

When formed from beatable solvent-spun regenerated cellulose fibers, separators of the present embodiments preferably have a curvature rate in the range of 1.5 to 15, more preferably 2 to 10.

A curvature rate of less than 1.5 results in an increased number of short circuits of an electrochemical device. A curvature rate of more than 15 results in a long ion flow path length and often increased resistance.

A separator with a curvature rate in the range of 1.5 to 15 has high denseness and low resistance.

The curvature rate of a separator will be described below with reference to FIGS. 1 to 3.

Figure 1:
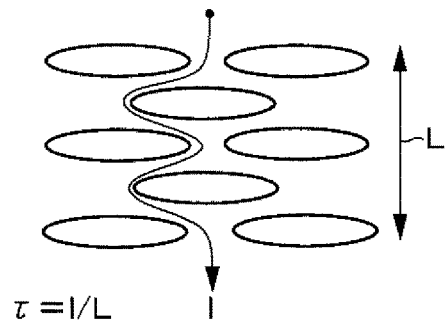
FIG. 1 is an explanatory view of the curvature rate of a separator according to an embodiment of the present invention indicated by the relationship between separator thickness and ion flow path length.

FIG. 1 illustrates cross sections of fibers constituting a separator and the flow path of ions passing between fibers in a cross section of the separator. The ion flow path is indicated by an arrow. The curvature rate τ is calculated from the separator thickness L and the ion flow path length I using $\tau = I/L$. In FIG. 1, the cross sections of fibers are horizontally oriented elliptical.

Figure 2:
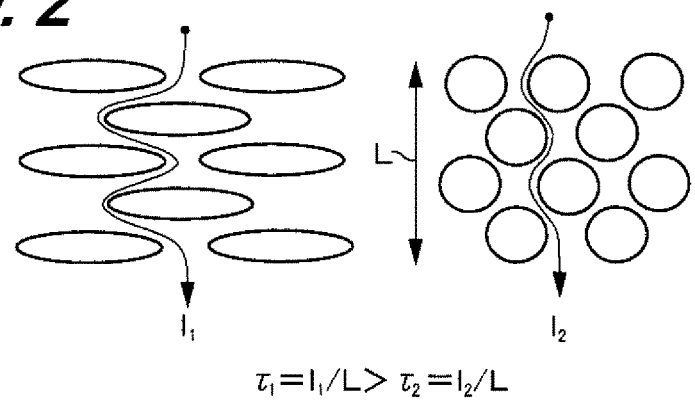
FIG. 2 is a schematic view comparing the curvature rates of two types of separators.
Figure 3:
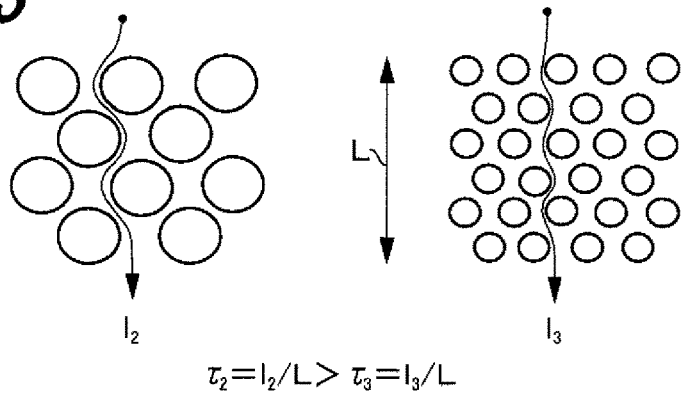
FIG. 3 is a schematic view comparing the curvature rates of two types of separators.

FIGS. 2 and 3 compare the curvature rates of two types of separators.

In the left in FIG. 2, cross sections of fibers are horizontally oriented elliptical as in FIG. 1, and the separator with a thickness L has an ion flow path length $I_1$. In the right in FIG. 2, cross sections of fibers are circular, and the separator with a thickness L has an ion flow path length $l_2$. Since the ion flow path length $l_1$ is longer than the ion flow path length $l_2$ in FIG. 2, the curvature rate $\tau_1 = l_1/L$ in the left is higher than the curvature rate $\tau_2 = l_2/L$ in the right. Thus, the curvature rate is higher in the separator with the horizontally oriented elliptical cross sections of fibers than in the separator with the circular cross sections of fibers.

The left separator in FIG. 3 is the same as the right separator in FIG. 2. More specifically, cross sections of fibers are circular, and the separator with a thickness L has an ion flow path length $l_2$. In the right in FIG. 3, cross sections of fibers are circles with a small diameter, and the separator with a thickness L has an ion flow path length $l_3$. Since the ion flow path length $l_2$ is longer than the ion flow path length $l_3$ in FIG. 3, the curvature rate $\tau_2 = l_2/L$ in the left separator is higher than the curvature rate $\tau_3 = l_3/L$ in the right separator. Thus, the curvature rate is higher in the separator with a large fiber diameter than in the separator with a small fiber diameter.

Solvent-spun regenerated cellulose fibers after beating preferably have a core portion with an average fiber diameter in the range of 1 to 11 μm, more preferably 1.5 to 9 μm.

When the core portion has an average fiber diameter of less than 1 μm, many fibers pass through wires of a paper machine, which results in a low yield. This also results in an excessively low curvature rate and an increased number of short circuits. This further results in a decreased number of connections between fibers and a low-strength separator.

When the core portion after beating has an average fiber diameter of more than 11 μm, the ion flow path length increases, and the separator has a high curvature rate. This also often results in a large separator thickness, making it difficult to decrease the size of a device.

Figure 4:
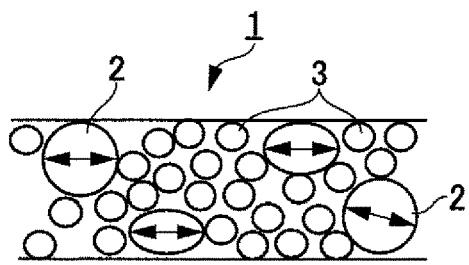
FIG. 4 is an explanatory view of a method for measuring "the average fiber diameter of a core portion" in the present invention.

A method for measuring "the average fiber diameter of a core portion" in the present invention is illustrated in FIG. 4.

FIG. 4 illustrates a cross section of a separator 1, which includes a core 2 with a fiber diameter of 1 μm or more and a fibril 3 with a fiber diameter of less than 1 μm formed by beating. The "average fiber diameter of a core portion" can be measured by extracting the cores 2 from the fibers in the separator 1, measuring the fiber diameter of each of the cores 2, and calculating the average value of the fiber diameters of the cores 2.

The separator preferably has a thickness in the range of 5 to 100 μm, more preferably 15 to 60 μm. A thickness of less than 5 μm results in a separator not only with low denseness but also with low strength.

A thickness of more than 100 μm results in a long interelectrode distance of an electrochemical device and results in high resistance of the device even with a low curvature rate. Such a large separator thickness also makes it difficult to decrease the size of the device.

The separator preferably has a density in the range of 0.25 to 0.9 g/cm³, more preferably 0.35 to 0.8 g/cm³.

A density of less than 0.25 g/cm³ results in low denseness of the separator and possibly an increased number of short circuits of an electrochemical device. Thus, the separator thickness needs to be increased to prevent a short circuit.

A density of more than 0.9 g/cm³ requires repeated beating in order that the fiber diameter of cores is less than 1 μm. This results in a low yield in a paper-making process and a low-strength separator with a low curvature rate.

The following is the reason that a separator according to the present invention contains only beatable solvent-spun regenerated cellulose fibers and does not contain natural cellulose fibers or other synthetic fibers.

Beatable solvent-spun regenerated cellulose fibers are formed by dissolving cellulose in an organic solvent, such as N-methylmorpholine-N-oxide, to prepare a spinning solution and by extruding the spinning solution from a spinning nozzle. It is therefore possible to desirably control the initial fiber shape and fiber diameter and to easily adjust the curvature rate of a separator by beating.

Natural cellulose generally has thick cores and significantly increases the curvature rate. Natural cellulose even having thin cores before beating has low rigidity and is easily flatten in a paper-making process. Thus, natural cellulose tends to have a higher curvature rate than solvent-spun regenerated cellulose.

Synthetic fibers have no hydrogen bond and, in combination with cellulose, have low strength. Thus, separators are broken or torn in an electrochemical device production process, which decreases productivity.

Furthermore, synthetic fibers have lower wettability by electrolytic solutions than cellulose and may decrease the productivity and life of electrochemical devices.

Although a typical example of beatable solvent-spun regenerated cellulose fibers is lyocell, any beatable solvent-spun regenerated cellulose other than lyocell may also be used.

Although the fiber diameter before beating is not particularly limited, an excessively large initial fiber diameter results in low flowability during beating and tends to cause a defect, such as clogging. An excessively small initial fiber diameter results in a decreased number of fibrils formed by beating, thus making it difficult to ensure denseness. Thus, the initial fiber diameter preferably ranges from 3 to 18 μm.

Separators of the present embodiments can be produced by controlling the raw material concentration and total load in beating.

Solvent-spun regenerated cellulose fibers are fibrillated and gradually shortened by beating. The fibrillation and shortening rate is fast at the beginning of beating and slows down from the middle to the end of beating.

A high concentration of fibers become finer by beating due to friction between fibers rather than due to cutting by a cutting tool. Thus, fibrillation predominates over shortening during beating, and the fiber diameter can be decreased simultaneously with fibrillation. At a low raw material concentration, shortening predominates over fibrillation, thus making it difficult to decrease the fiber diameter.

Tests and researches on various beating concentrations showed that the initial beating concentration preferably ranges from 5% to 15% by mass, and the middle to the end beating concentration preferably ranges from 2% to 8% by mass.

An initial beating concentration in the range of 5% to 15% by mass enables one to decrease the fiber diameter simultaneously with fibrillation. At an initial beating concentration of less than 5%, cutting by a cutting tool predominates over friction between fibers, thus remarkably promoting shortening. An initial beating concentration of more than 15% results in poor flowability of a raw material and clogging with the raw material.

When the middle to the end beating concentration ranges from 2% to 8% by mass, the fiber diameter can be decreased while fibrils formed at the beginning of beating are held on the fiber core. A concentration of less than 2% results in falling of fibrils due to shear force by a cutting tool and results in shortening. At a concentration of more than 8%, fibers entangled at the beginning of beating cannot be unraveled, and the apparent fiber diameter increases due to entangled fibers.

The beating concentration can be measured with various concentration meters or by various methods. In the present embodiments, the beating concentration was determined by drying 50 g of a raw material to be beaten and measuring the difference between the mass before beating and the mass after beating.

More specifically, the following formula 1:

$$C=(W/50)\times 100 \qquad \text{Formula 1:}$$

wherein C denotes the beating concentration (% by mass), and W denotes the mass of a raw material after drying (absolute dry mass).

The beginning of beating in the present embodiments refers to the period for which the average fiber length is decreased to 60% of the average fiber length before beating. The period after the beginning of beating is referred to as the middle to the end of beating.

Although the fiber length before beating is not particularly limited, an excessively long initial fiber length results in entanglement during beating, thus making homogeneous beating difficult, and an excessively short initial fiber length results in a decreased number of fiber bonded portions and low strength. Thus, the initial fiber length preferably ranges from 1 to 8 mm.

It is also important to control the total load in beating.

The total load in the present embodiments is calculated by dividing the electric power consumed from the beginning to the end of beating by the weight of a raw material and is expressed in kWh/kg.

Tests and researches on various total loads of beating showed that the total load preferably ranges from 1 to 15 kWh/kg. The core portion can have an average fiber diameter in a specified range by controlling of the beating concentration and by controlling of the total load of beating in this range.

Equipment for beating fibers may be any equipment generally used to prepare a raw material for paper-making. In general, a beater, a conical refiner, a disk refiner, or a high-pressure homogenizer may be used.

Employing these constituents, the present embodiments can provide a separator for an electrochemical device with high denseness, resistance, and wettability by electrolytic solutions. The separator can be used to provide an electrochemical device with a low short circuit rate, high productivity, and long life without adverse effects on resistance performance.

[Evaluation Method for Separator and Electrochemical Device]

The characteristics of separators for electrochemical devices according to the present embodiments (hereinafter also referred to simply as "separators") are specifically measured by the following methods under the following conditions.

[Measurement of Thickness]

The thickness of a separator was measured by a method of folding paper in ten described in "5.1.3 Measurement of folded paper" using a micrometer described in "5.1.1 Measuring device and measuring method a) Use of external micrometer" specified in JIS C 2300-2 "Cellulosic papers for electrical purposes—Part 2: Methods of test 5.1 Thickness".

[Average Fiber Diameter of Core Portion after Beating]

A separator was observed by SEM. The lengths of 50 core portions (fibers 1 μm or more in diameter) were measured and averaged.

For flat fibers, the length of a longitudinal portion was measured.

[Measurement of Density]

The density of a separator in an absolute dry state was measured by a method specified by the B method of JIS C 2300-2 "Cellulosic papers for electrical purposes—Part 2: Methods of test 7.0A Density".

[Curvature Rate]

The curvature rate can be determined from the thickness, Gurley value, porosity, and pore diameter of a separator. More specifically, the curvature rate was calculated using the following formula 2 described in the literature (Callahan et al., "Characterization of Microporus Membrane Separators", The Tenth International Seminar on Primary and Secondary Battery Technology and Applications, Mar. 2, 1993).

$$\tau=\{(t\cdot\varepsilon\cdot d)/(5\cdot 18\cdot 10^{-3}\cdot L)\}^{(1/2)} \qquad \text{Formula 2:}$$

τ denotes the curvature rate, L denotes the separator thickness (μm), t denotes the Gurley value (s/100 ml), ε denotes the porosity, and d denotes the pore diameter (μm).

The Gurley value was measured by a method specified in 5 Gurley test method of JIS P 8117 "Paper and board—Determination of air permeance and air resistance (medium range)—Gurley method".

The porosity was calculated from the ratio of the density of a separator to the specific gravity of the material of the separator using the following formula 3.

$$\varepsilon=1-(D1/D2) \qquad \text{Formula 3:}$$

ε denotes the porosity, D1 denotes the density of the separator, and D2 denotes the specific gravity of the material of the separator.

The pore diameter is the average pore size measured with an apparatus according to JIS K3832 "Testing methods for bubble point of membrane filters 3.(1) Filter disk bubble point test apparatus" (a capillary flow meter CFP-1200 (manufactured by PMI) was used in the present embodiments).

In the following description, separators for electrochemical devices of the present embodiments are used in an aluminum electrolytic capacitor, an electric double layer capacitor, a lithium ion capacitor, a lithium primary battery, and a lithium-ion secondary battery. However, the separators for electrochemical devices of the present embodiments may also be used in other electrochemical devices.

[Production of Aluminum Electrolytic Capacitor Including Separator]

A method for producing an aluminum electrolytic capacitor including one of the separators for electrochemical devices of the present embodiments will be described below.

An aluminum electrolytic capacitor including one of the separators for electrochemical devices of the present embodiments can be fabricated by impregnating the separator with an electrolytic solution and separating the anode foil from the cathode foil using the separator.

In such an aluminum electrolytic capacitor, if necessary, a plurality of separators may be disposed between the electrodes within the permissible limit of the outer diameter of the capacitor device.

The electrolytic solution may be any ordinary electrolytic solution. In general electrolytic solutions, a solute, such as boric acid, adipic acid, maleic acid, or an ammonium salt thereof, is dissolved in a solvent, such as ethylene glycol (hereinafter abbreviated to EG), γ-butyrolactone (hereinafter abbreviated to GBL), dimethylformamide, or sulfolane.

However, the electrolytic solution is not limited to these examples and combinations thereof and may be any ordinary electrolytic solution.

For an aluminum electrolytic capacitor, an aluminum foil anode and an aluminum foil cathode each subjected to etching and oxide film treatment were wound with a separator interposed therebetween such that the foils did not come into contact with each other, thereby producing an aluminum electrolytic capacitor device. The device was placed in a closed-end cylindrical aluminum case. An ammonium adipate electrolyte was dissolved in a GBL or EG solvent to prepare an electrolytic solution. The device was impregnated with the electrolytic solution under vacuum. The case was sealed with a sealing rubber. Thus, an aluminum electrolytic capacitor was produced.

[Production of Electric Double Layer Capacitor Including Separator]

A method for producing an electric double layer capacitor including one of the separators for electrochemical devices of the present embodiments will be described below.

An electric double layer capacitor including one of the separators for electrochemical devices of the present embodiments can be fabricated by impregnating the separator with an organic electrolytic solution and separating a pair of polarizable electrodes using the separator.

The organic electrolytic solution may be produced by dissolving a salt of a cationic species, such as tetraethylammonium or triethylmethylammonium, and an anionic species, such as tetrafluoroborate or hexafluorophosphate, in an organic solvent, such as propylene carbonate or acetonitrile. However, the electrolytic solution is not limited to these examples and combinations thereof and may be any ordinary electrolytic solution.

For an electric double layer capacitor, an activated carbon electrode and a separator according to the present invention were wound to produce an electric double layer capacitor device. The device was placed in a closed-end cylindrical aluminum case. A tetraethylammonium tetrafluoroborate electrolyte was dissolved in a propylene carbonate solvent to prepare an electrolytic solution. The device was impregnated with the electrolytic solution under vacuum. The case was sealed with a sealing rubber. Thus, an electric double layer capacitor was produced.

[Production of Lithium Ion Capacitor Including Separator]

A method for producing a lithium ion capacitor including one of the separators for electrochemical devices of the present embodiments will be described below.

A lithium ion capacitor including one of the separators for electrochemical devices of the present embodiments can be fabricated by impregnating the separator with an organic electrolytic solution and separating a pair of electrodes using the separator.

As in electric double layer capacitors, the positive-electrode material is generally an electrode produced by bonding fine powdered activated carbon to a metal foil current collector with a binder.

The negative-electrode material is generally an electrode produced by bonding graphite or black lead to a metal foil current collector with a binder.

The organic electrolytic solution is generally produced by dissolving a salt of lithium ions and an anionic species, such as tetrafluoroborate or hexafluorophosphate, in an organic solvent, such as propylene carbonate, ethylene carbonate, dimethyl carbonate, diethyl carbonate, or methyl ethyl carbonate.

However, both electrode materials and the electrolytic solution are not limited to these examples and combinations thereof and may be any ordinary electrode materials and electrolytic solution.

An activated carbon electrode for a lithium ion capacitor was used as a positive-electrode material, and a graphite electrode was used as a negative-electrode material. A separator and electrode materials were alternately folded to produce a lithium ion capacitor device. The device, together with a lithium predoping foil, was surrounded by a multilayer laminated film, was impregnated with a electrolytic solution under vacuum, and was sealed. Thus, a lithium ion capacitor was produced. The electrolytic solution was produced by dissolving a lithium hexafluorophosphate electrolyte in a propylene carbonate solvent.

[Production of Lithium Primary Battery Including Separator]

A method for producing a lithium primary battery including one of the separators for electrochemical devices of the present embodiments will be described below.

A lithium primary battery including one of the separators for electrochemical devices of the present embodiments can be fabricated by impregnating the separator with an organic electrolytic solution and separating a positive electrode containing manganese dioxide or graphite fluoride from a negative electrode containing a light metal, such as lithium, lithium, or a lithium alloy, using the separator.

The organic electrolytic solution is generally produced by dissolving a salt of lithium ions and an anionic species, such as tetrafluoroborate, in an organic solvent, such as GBL, propylene carbonate, dimethoxyethane, or tetrahydrofuran.

However, both electrode materials and the electrolytic solution are not limited to these examples and combinations thereof and may be any ordinary electrode materials and electrolytic solution.

A manganese dioxide positive-electrode material and a lithium metal negative electrode were wound with the separator interposed therebetween, thereby producing a lithium primary battery device. The device was placed in an exterior can, into which an electrolytic solution was poured. An opening of the exterior can was laser-sealed with a battery lid. Thus, a lithium primary battery was produced. The electrolytic solution was produced by dissolving lithium ions and tetrafluoroborate in a GBL solvent.

[Production of Lithium-Ion Secondary Battery Including Separator]

A method for producing a lithium-ion secondary battery including one of the separators for electrochemical devices of the present embodiments will be described below.

A lithium-ion secondary battery including one of the separators for electrochemical devices of the present embodiments can be fabricated by impregnating the separator with an organic electrolytic solution and separating a pair of electrodes using the separator.

The positive-electrode material is generally an electrode produced by bonding lithium cobalt oxide, lithium nickel oxide, lithium manganese oxide, and a combination thereof to a metal foil current collector with a binder.

As in lithium ion capacitors, the negative-electrode material is generally an electrode produced by bonding black lead or graphite to a metal foil current collector with a binder.

The organic electrolytic solution is generally produced by dissolving a salt of lithium ions and an anionic species, such as tetrafluoroborate or hexafluorophosphate, in an organic solvent, such as propylene carbonate, ethylene carbonate, dimethyl carbonate, diethyl carbonate, or methyl ethyl carbonate.

However, both electrode materials and the electrolytic solution are not limited to these examples and combinations thereof and may be any ordinary electrode materials and electrolytic solution.

A lithium cobalt oxide electrode for a lithium-ion secondary battery was used as a positive-electrode material. A graphite electrode was used as a negative electrode material. The lithium cobalt oxide electrode and the graphite electrode were wound together with the separator, thereby producing a lithium-ion secondary battery device. The device was placed in a closed-end cylindrical case. A lithium ion and tetrafluoroborate electrolyte was dissolved in a propylene carbonate solvent to prepare an electrolytic solution. The case was sealed with a pressing machine to produce a lithium-ion secondary battery.

[Evaluation Method for Electrochemical Device]

The specific performance of electrochemical devices of the present embodiments was evaluated by the following methods under the following conditions.

[Capacitance]

The capacitance of an aluminum electrolytic capacitor was determined by a method of "4.7 Capacitance" specified in JIS C 5101-1 "Fixed capacitors for use in electronic equipment—Part 1: Generic specification".

The capacitance of an electric double layer capacitor and a lithium ion capacitor was determined by a constant-current discharge method of "4.5 Capacitance" specified in JIS C 5160-1 "Fixed electric double-layer capacitors for use in electronic equipment—Part 1: Generic specification".

[Discharge Capacity]

The discharge capacity of a lithium primary battery was calculated from the duration of electrical discharge to a final voltage of 2.0 V under the conditions of "5.2 Electrical discharge test" specified in JIS C 8500 "Primary batteries—General".

The discharge capacity of a lithium-ion secondary battery was measured according to "8.4.1 Electrical discharge performance test" specified in JIS C 8715-1 "Secondary lithium cells and batteries for use in industrial applications—Part 1: Tests and requirements of performance".

[Impedance]

The resistance of an aluminum electrolytic capacitor was determined by a method of "4.10 Impedance" specified in JIS C 5101-1 "Fixed capacitors for use in electronic equipment—Part 1: Generic specification".

[Internal Resistance]

The internal resistance of an electric double layer capacitor and a lithium ion capacitor was measured by an alternating current (a.c.) resistance method of "4.6 Internal resistance" specified in JIS C 5160-1 "Fixed electric double-layer capacitors for use in electronic equipment—Part 1: Generic specification".

The internal resistance r (Ω) of a lithium primary battery was calculated using the following formula from the voltage E1 (V) of the battery and the voltage E2 (V) of the battery measured when an electric current flowed through an electric circuit coupled to a resistor R (Ω).

$$r = R(E1-E2)/E2$$

The internal resistance of a lithium-ion secondary battery was measured according to "8.6.3 Alternating current internal resistance" specified in JIS C 8715-1 "Secondary lithium cells and batteries for use in industrial applications—Part 1: Tests and requirements of performance".

[Short Circuit Rate]

The short circuit rate of an electrochemical device was the percentage calculated by dividing the number of electrochemical devices having a short circuit by the number of electrochemical devices produced. A short circuit herein refers to a failure in an electrical circuit when the charge voltage cannot be increased to the rated voltage.

EXAMPLES

Specific examples of the separators according to the embodiments of the present invention will be described below.

For a separator of the present example, solvent-spun regenerated cellulose was used to form a nonwoven fabric by a paper-making method using a Fourdrinier paper machine, a Fourdrinier cylinder paper machine, or a TANMO (short Fourdrinier) cylinder paper machine. In other words, a wet nonwoven fabric was used to produce a separator.

Example 1

Lyocell fibers (hereinafter referred to as lyocell) formed of solvent-spun regenerated cellulose were beaten at a first stage concentration of 15%, at a second stage concentration of 8%, and at a total load of 15 kWh/kg to produce a raw material for paper-making. The raw material had a core portion (hereinafter also referred to simply as a "core") with an average fiber diameter of 1 µm. The raw material was subjected to Fourdrinier paper-making to form a separator. The separator thus formed had a thickness of 5 µm, a density of 0.90 g/cm³, a Gurley value of 1.5 s/100 ml, a pore diameter of 0.1 µm, and a curvature rate of 1.5.

The separator and a GBL electrolytic solution were used to form an aluminum electrolytic capacitor of Example 1. The aluminum electrolytic capacitor had a rated voltage of 6.3 WV, a capacitance of 1000 µF, and a cell size of 10 mmφ×20 mm.

Example 2

Lyocell was beaten at a first stage concentration of 14%, at a second stage concentration of 7.5%, and at a total load of 14.5 kWh/kg to produce a raw material for paper-making. The raw material had a core with an average fiber diameter of 1.5 µm. The raw material was subjected to Fourdrinier paper-making to form a separator. The separator thus formed had a thickness of 10 µm, a density of 0.80 g/cm³, a Gurley value of 2.0 s/100 ml, a pore diameter of 0.2 µm, and a curvature rate of 1.9.

The separator and a GBL electrolytic solution were used to form an aluminum electrolytic capacitor of Example 2. The aluminum electrolytic capacitor had a rated voltage of 6.3 WV, a capacitance of 1000 µF, and a cell size of 10 mmφ×20 mm.

Comparative Example 1

Lyocell was beaten at a first stage concentration of 15%, at a second stage concentration of 8%, and at a total load of 15 kWh/kg to produce a raw material for paper-making. The raw material had a core with an average fiber diameter of 1.0 µm. The raw material was subjected to Fourdrinier paper-making to form a separator. The separator thus formed had a thickness of 3 µm, a density of 0.90 g/cm³, a Gurley value of 0.7 s/100 ml, a pore diameter of 0.1 µm, and a curvature rate of 1.3.

The separator and a GBL electrolytic solution were used to form an aluminum electrolytic capacitor with a rated voltage of 6.3 WV, a capacitance of 1000 µF, and a cell size of 10 mmφ×20 mm. However, the separator was broken one after another in a capacitor production process, and the separator could not be produced.

Comparative Example 2

Lyocell was beaten at a first stage concentration of 15%, at a second stage concentration of 8%, and at a total load of 16 kWh/kg to produce a raw material for paper-making. The raw material had a core with an average fiber diameter of 0.5 μm. The raw material was subjected to Fourdrinier paper-making to form a separator. The separator thus formed had a thickness of 5 μm, a density of 0.93 g/cm$^3$, a Gurley value of 1.5 s/100 ml, a pore diameter of 0.08 μm, and a curvature rate of 1.3.

The separator and a GBL electrolytic solution were used to form an aluminum electrolytic capacitor with a rated voltage of 6.3 WV, a capacitance of 1000 μF, and a cell size of 10 mmϕ×20 mm. However, the separator was broken one after another in a capacitor production process, and the separator could not be produced.

Example 3

Lyocell was beaten at a first stage concentration of 5%, at a second stage concentration of 2%, and at a total load of 1 kWh/kg to produce a raw material for paper-making. The raw material had a core with an average fiber diameter of 11 μm. The raw material was subjected to Fourdrinier paper-making to form a separator. The separator thus formed had a thickness of 100 μm, a density of 0.25 g/cm$^3$, a Gurley value of 19 s/100 ml, a pore diameter of 7.3 μm, and a curvature rate of 15.

The separator and a GBL electrolytic solution were used to form an aluminum electrolytic capacitor of Example 3. The aluminum electrolytic capacitor had a rated voltage of 450 WV, a capacitance of 50 μF, and a cell size of 18 mmϕ×20 mm.

Comparative Example 3

Lyocell was beaten at a first stage concentration of 5%, at a second stage concentration of 2%, and at a total load of 0.8 kWh/kg to produce a raw material for paper-making. The raw material had a core with an average fiber diameter of 12 μm. The raw material was subjected to Fourdrinier paper-making to form a separator. The separator thus formed had a thickness of 105 μm, a density of 0.23 g/cm$^3$, a Gurley value of 21.4 s/100 ml, a pore diameter of 8.1 μm, and a curvature rate of 16.

The separator and a GBL electrolytic solution were used to form an aluminum electrolytic capacitor of Comparative Example 3. The aluminum electrolytic capacitor had a rated voltage of 450 WV, a capacitance of 50 μF, and a cell size of 18 mmϕ×20 mm.

Example 4

Lyocell was beaten at a first stage concentration of 7%, at a second stage concentration of 3%, and at a total load of 3 kWh/kg to produce a raw material for paper-making. The raw material had a core with an average fiber diameter of 10 μm. The raw material was subjected to Fourdrinier cylinder paper-making to form a two-layer separator. The two-layer separator thus formed had a thickness of 70 μm, a density of 0.33 g/cm$^3$, a Gurley value of 15 s/100 ml, a pore diameter of 4.9 μm, and a curvature rate of 12.

The separator and an EG electrolytic solution were used to form an aluminum electrolytic capacitor of Example 4. The aluminum electrolytic capacitor had a rated voltage of 200 WV, a capacitance of 120 μF, and a cell size of 18 mmϕ×25 mm.

Example 5

Lyocell was beaten at a first stage concentration of 8%, at a second stage concentration of 4%, and at a total load of 5 kWh/kg to produce a raw material for paper-making. The raw material had a core with an average fiber diameter of 9 μm. The raw material was subjected to TANMO (short Fourdrinier) cylinder paper-making to form a two-layer separator. The two-layer separator thus formed had a thickness of 60 μm, a density of 0.35 g/cm$^3$, a Gurley value of 11.7 s/100 ml, a pore diameter of 3.8 μm, and a curvature rate of 10.

The separator and an EG electrolytic solution were used to form an aluminum electrolytic capacitor of Example 5. The aluminum electrolytic capacitor had a rated voltage of 200 WV, a capacitance of 120 μF, and a cell size of 18 mmϕ×25 mm.

Conventional Example 1

A two-layer separator with a thickness of 60 μm, a density of 0.80 g/cm$^3$, a Gurley value of 30000 s/100 ml, a pore diameter of 0.01 μm, and a curvature rate of 21 was produced with a Fourdrinier cylinder paper machine.

For a layer formed by Fourdrinier paper-making, 100% by mass of natural cellulose kraft pulp was beaten at a first stage concentration of 15%, at a second stage concentration of 8%, and at a total load of 15 kWh/kg, and a raw material for paper-making having a core with an average fiber diameter of 20 μm was used. For a layer formed by cylinder paper-making, 100% by mass of unbeaten kraft pulp and a raw material for paper-making having a core with an average fiber diameter of 40 μm were used.

The separator and an EG electrolytic solution were used to form an aluminum electrolytic capacitor of Conventional Example 1. The aluminum electrolytic capacitor had a rated voltage of 200 WV, a capacitance of 120 μF, and a cell size of 18 mmϕ×25 mm.

Example 6

Lyocell was beaten at a first stage concentration of 9%, at a second stage concentration of 5%, and at a total load of 7 kWh/kg to produce a raw material for paper-making. The raw material had a core with an average fiber diameter of 7 μm. The raw material was subjected to Fourdrinier paper-making to form a separator. The separator thus formed had a thickness of 20 μm, a density of 0.40 g/cm$^3$, a Gurley value of 8.5 s/100 ml, a pore diameter of 0.8 μm, and a curvature rate of 7.

The separator and a GBL electrolytic solution were used to form an aluminum electrolytic capacitor of Example 6. The aluminum electrolytic capacitor had a rated voltage of 50 WV, a capacitance of 150 μF, and a cell size of 10 mmϕ×20 mm.

Example 7

Lyocell was beaten at a first stage concentration of 10%, at a second stage concentration of 5.5%, and at a total load of 8 kWh/kg to produce a raw material for paper-making. The raw material had a core with an average fiber diameter of 5 μm. The raw material was subjected to Fourdrinier paper-making to form a separator. The separator thus formed had a thickness of 15 μm, a density of 0.50 g/cm$^3$, a Gurley value of 6.3 s/100 ml, a pore diameter of 0.5 μm, and a curvature rate of 5.

The separator and a GBL electrolytic solution were used to form an aluminum electrolytic capacitor of Example 7. The aluminum electrolytic capacitor had a rated voltage of 50 WV, a capacitance of 150 μF, and a cell size of 10 mmφ×20 mm.

Comparative Example 4

90% by mass of lyocell was beaten at a first stage concentration of 13%, at a second stage concentration of 7%, and at a total load of 12 kWh/kg to produce a beaten raw material. The beaten raw material thus produced had a core with an average fiber diameter of 3.5 μm and was mixed with 10% by mass of PET fibers to produce a raw material for paper-making. The raw material was subjected to Fourdrinier paper-making to form a separator. The separator thus formed had a thickness of 20 μm, a density of 0.35 g/cm$^3$, a Gurley value of 1.5 s/100 ml, a pore diameter of 1.0 μm, and a curvature rate of 3.

The separator and a GBL electrolytic solution were used to form an aluminum electrolytic capacitor of Comparative Example 4. The aluminum electrolytic capacitor had a rated voltage of 50 WV, a capacitance of 150 μF, and a cell size of 10 mmφ×20 mm.

Comparative Example 5

90% by mass of lyocell was beaten at a first stage concentration of 7%, at a second stage concentration of 3%, and at a total load of 3 kWh/kg to produce a beaten raw material. The beaten raw material thus produced had a core with an average fiber diameter of 10 μm and was mixed with 10% by mass of unbeaten esparto pulp to produce a raw material for paper-making. The raw material was subjected to Fourdrinier paper-making to form a separator. The separator thus formed had a thickness of 20 μm, a density of 0.45 g/cm$^3$, a Gurley value of 15 s/100 ml, a pore diameter of 1.6 μm, and a curvature rate of 13.

The separator and a GBL electrolytic solution were used to form an aluminum electrolytic capacitor of Comparative Example 5. The aluminum electrolytic capacitor had a rated voltage of 50 WV, a capacitance of 150 μF, and a cell size of 10 mmφ×20 mm.

Conventional Example 2

60% by mass of unbeaten esparto pulp and 40% by mass of unbeaten abaca pulp were mixed to produce a raw material for paper-making. The raw material had a core with an average fiber diameter of 14 μm. The raw material was subjected to cylinder paper-making to form a separator. The separator thus formed had a thickness of 20 μm, a density of 0.25 g/cm$^3$, a Gurley value of 0.04 s/100 ml, a pore diameter of 6.2 μm, and a curvature rate of 1.4.

The separator and a GBL electrolytic solution were used to form an aluminum electrolytic capacitor of Conventional Example 2. The aluminum electrolytic capacitor had a rated voltage of 50 WV, a capacitance of 150 μF, and a cell size of 10 mmφ×20 mm.

Example 8

Lyocell was beaten at a first stage concentration of 9%, at a second stage concentration of 5%, and at a total load of 6 kWh/kg to produce a raw material for paper-making. The raw material had a core with an average fiber diameter of 8 μm. The raw material was subjected to Fourdrinier paper-making to form a separator. The separator thus formed had a thickness of 40 μm, a density of 0.40 g/cm$^3$, a Gurley value of 13.1 s/100 ml, a pore diameter of 1.0 μm, and a curvature rate of 7.

The separator was used to produce an electric double layer capacitor of Example 8, which had a rated voltage of 2.7 V, a capacitance of 300 F, and a cell size of 35 mmφ×60 mm.

The separator was also used to produce a lithium ion capacitor of Example 8, which had a rated voltage of 3.8 V, a capacitance of 1000 F, and a cell size of 180 mm×125 mm×6 mm.

Conventional Example 3

Lyocell was beaten at a first stage concentration of 6%, at a second stage concentration of 4%, and at a total load of 3 kWh/kg to produce a raw material for paper-making. The raw material had a core with an average fiber diameter of 11.5 μm. The raw material was subjected to Fourdrinier paper-making to form a separator. The separator thus formed had a thickness of 40 μm, a density of 0.40 g/cm$^3$, a Gurley value of 10.2 s/100 ml, a pore diameter of 1.8 μm, and a curvature rate of 8.

The separator was used to produce an electric double layer capacitor of Conventional Example 3, which had a rated voltage of 2.7 V, a capacitance of 300 F, and a cell size of 35 mmφ×60 mm.

The separator was also used to produce a lithium ion capacitor of Conventional Example 3, which had a rated voltage of 3.8 V, a capacitance of 1000 F, and a cell size of 180 mm×125 mm×6 mm.

Example 9

Lyocell was beaten at a first stage concentration of 9%, at a second stage concentration of 5%, and at a total load of 6 kWh/kg to produce a raw material for paper-making. The raw material had a core with an average fiber diameter of 8 μm. The raw material was subjected to Fourdrinier paper-making to form a separator. The separator thus formed had a thickness of 100 μm, a density of 0.40 g/cm$^3$, a Gurley value of 30.1 s/100 ml, a pore diameter of 0.9 μm, and a curvature rate of 6.

The separator was used to produce a lithium primary battery of Example 9, which had a rated voltage of 3.0 V, a discharge capacity of 950 mAh, and a cell size of 14 mmφ×25 mm.

Conventional Example 4

A separator with a thickness of 200 μm, a density of 0.40 g/cm$^3$, a Gurley value of 2.5 s/100 ml, a pore diameter of 30.6 μm, and a curvature rate of 6 was produced with a melt blowing apparatus. 100% by mass of polypropylene was used as a raw material. The separator had a fiber diameter of 8 μm.

The separator was used to produce a lithium primary battery of Conventional Example 4, which had a rated voltage of 3.0 V, a discharge capacity of 950 mAh, and a cell size of 14 mmφ×25 mm.

Example 10

Lyocell was beaten at a first stage concentration of 13%, at a second stage concentration of 7%, and at a total load of 14 kWh/kg to produce a raw material for paper-making. The raw material had a core with an average fiber diameter of 3 µm. The raw material was subjected to Fourdrinier paper-making and then to calendering to form a separator. The separator thus formed had a thickness of 15 µm, a density of 0.70 g/cm$^3$, a Gurley value of 7 s/100 ml, a pore diameter of 0.3 µm, and a curvature rate of 3.8.

The separator was used to produce a lithium-ion secondary battery of Example 10, which had a rated voltage of 4.2 V, a discharge capacity of 2200 mAh, and a cell size of 18 mmφ×65 mm.

Conventional Example 5

A polyolefin microporous film with a thickness of 15 µm and a curvature rate of 1.7 was used to produce a lithium-ion secondary battery of Conventional Example 5, which had a rated voltage of 4.2 V, a discharge capacity of 2200 mAh, and a cell size of 18 mmφ×65 mm.

Tables 1 to 4 list the evaluation results of the separators alone and the performance evaluation results of the electrochemical devices according to the present embodiments, Comparative Examples 1 to 5, and Conventional Examples 1 to 5. Each of the measured values in the tables is an average value of 1000 electrochemical devices.

TABLE 1

| | Raw materials | | Fiber diameter of core (µm) | Physical properties of separator | | | | | | Performance of aluminum electrolytic capacitor | | | | |
|---|---|---|---|---|---|---|---|---|---|---|---|---|---|---|
| | Name | Amount (%) | | Thickness (µm) | Density (g/cm$^3$) | Porosity (%) | Gurley value sec/100 ml | Pore diameter (µm) | Curvature rate | Electrolytic solution | Voltage (WV) | Capacitance (µF) | Impedance (Ω/100 kHz) | Short circuit rate (%) |
| Example 1 | Lyocell | 100 | 1 | 5 | 0.90 | 40 | 1.5 | 0.1 | 1.5 | GBL | 6.3 | 1000 | 0.111 | 0.8 |
| Example 2 | Lyocell | 100 | 1.5 | 10 | 0.80 | 47 | 2.0 | 0.2 | 1.9 | GBL | 6.3 | 1000 | 0.115 | 0.3 |
| Comparative example 1 | Lyocell | 100 | 1 | 3 | 0.90 | 40 | 0.7 | 0.1 | 1.3 | GBL | — | — | — | — |
| Comparative example 2 | Lyocell | 100 | 0.5 | 5 | 0.93 | 38 | 1.5 | 0.08 | 1.3 | GBL | — | — | — | — |
| Example 3 | Lyocell | 100 | 11 | 100 | 0.25 | 83 | 19.0 | 7.3 | 15 | GBL | 450 | 50 | 1.1 | 0 |
| Comparative example 3 | Lyocell | 100 | 12 | 105 | 0.23 | 85 | 21.4 | 8.1 | 16 | GBL | 450 | 50 | 1.6 | 0 |
| Example 4 | Lyocell | 100 | 10 | 70 | 0.33 | 78 | 15.0 | 4.9 | 12 | EG | 200 | 120 | 0.44 | 0 |
| Example 5 | Lyocell | 100 | 9 | 60 | 0.35 | 77 | 11.7 | 3.8 | 10 | EG | 200 | 120 | 0.38 | 0 |
| Conventional example 1 | High: kraft Low: kraft | 100 100 | 30 | 60 | 0.80 | 47 | 30000 | 0.01 | 21 | EG | 200 | 120 | 1.03 | 0 |
| Example 6 | Lyocell | 100 | 7 | 20 | 0.40 | 73 | 8.5 | 0.8 | 7 | GBL | 50 | 150 | 0.13 | 0 |
| Example 7 | Lyocell | 100 | 5 | 15 | 0.50 | 67 | 6.3 | 0.5 | 5 | GBL | 50 | 150 | 0.08 | 0 |
| Comparative example 4 | Lyocell PET | 90 10 | 3.5 | 20 | 0.35 | 77 | 1.5 | 1.0 | 3 | GBL | 50 | 150 | 0.07 | 1.1 |
| Comparative example 5 | Lyocell Esparto | 90 10 | 10 | 20 | 0.45 | 70 | 15.0 | 1.6 | 13 | GBL | 50 | 150 | 0.25 | 0 |
| Conventional example 2 | Esparto Abaca | 60 40 | 14 | 20 | 0.25 | 83 | 0.04 | 6.2 | 1.4 | GBL | 50 | 150 | 0.15 | 2.1 |

TABLE 2

| | Raw materials | | Fiber diameter of core (µm) | Physical properties of separator | | | | | | Performance of electric double layer capacitor |
|---|---|---|---|---|---|---|---|---|---|---|
| | Name | Amount (%) | | Thickness (µm) | Density (g/cm$^3$) | Porosity (%) | Gurley value sec/100 ml | Pore diameter (µm) | Curvature rate | Voltage (V) |
| Example 8 | Lyocell | 100 | 8 | 40 | 0.40 | 73 | 13.1 | 1.0 | 7 | 2.7 |
| Conventional example 3 | Lyocell | 100 | 11.5 | 40 | 0.40 | 73 | 10.2 | 1.8 | 8 | 2.7 |

| | Performance of electric double layer capacitor | | | | Lithium ion capacitor | | | |
|---|---|---|---|---|---|---|---|---|
| | Density (g/cm$^3$) | Capacitance (F) | Internal resistance (mΩ/100 kHz) | Short circuit rate (%) | Voltage (V) | Capacitance (F) | Internal resistance (mΩ/100 kHz) | Short circuit rate (%) |
| Example 8 | 0.4 | 300 | 0.4 | 0 | 3.8 | 1000 | 2.0 | 0 |
| Conventional example 3 | 0.3 | 300 | 1.5 | 0 | 3.8 | 1000 | 2.6 | 0 |

TABLE 3

| | Raw materials | | Fiber diameter of core (μm) | Physical properties of separator | | | | | | Lithium primary battery | | | | |
| | Name | Amount (%) | | Thickness (μm) | Density (g/cm³) | Porosity (%) | Gurley value sec/100 ml | Pore diameter (μm) | Curvature rate | Voltage V | Density g/cm³ | Discharge capacity mAh | Internal resistance Ω/100 kHz | Short circuit rate % |
|---|---|---|---|---|---|---|---|---|---|---|---|---|---|---|
| Example 9 | Lyocell | 100 | 8 | 100 | 0.40 | 73 | 30.1 | 0.9 | 6 | 3.0 | 0.4 | 950 | 5.6 | 0 |
| Conventional example 4 | PP | 100 | 8 | 200 | 0.40 | 56 | 2.5 | 30.6 | 6 | 3.0 | 0.4 | 950 | 7.2 | 0 |

TABLE 4

| | Raw materials | | Fiber diameter of core (μm) | Physical properties of separator | | | | | | Lithium-ion secondary battery | | | | |
| | Name | Amount (%) | | Thickness (μm) | Density (g/cm³) | Porosity (%) | Gurley value sec/100 ml | Pore diameter (μm) | Curvature rate | Voltage V | Density g/cm³ | Discharge capacity mAh | Internal resistance mΩ/100 kHz | Short circuit rate % |
|---|---|---|---|---|---|---|---|---|---|---|---|---|---|---|
| Example Fa10 | Lyocell | 100 | 3 | 15 | 0.70 | 53 | 7 | 0.3 | 3.8 | 4.2 | 0.7 | 2200 | 20 | 0 |
| Conventional example 5 | PE | 100 | — | 15 | 0.70 | 23 | 100.0 | 0.01 | 1.7 | 4.2 | 1.0 | 2200 | 76 | 0 |

Examples, Comparative Examples, and Conventional Examples will be described in detail below.

The separators of Examples 1 and 2 had a core with an average fiber diameter of 1 and 1.5 μm after beating and had a thickness of 5 and 10 μm, a density of 0.90 and 0.80 g/cm³, and a curvature rate of 1.5 and 2.0, respectively. The separator of Example 3 had a core with an average fiber diameter of 11 μm after beating and had a thickness of 100 μm, a density of 0.25 g/cm³, and a curvature rate of 15. The aluminum electrolytic capacitors including these separators had satisfactory performance. The separator of Example 2 had a lower short circuit rate than the separator of Example 1. This is because the separator of Example 2 had a higher curvature rate than the separator of Example 1 and had improved denseness. By contrast, the separators of Comparative Examples 1 and 2 had low strength and were broken in the aluminum electrolytic capacitor production process. Thus, the aluminum electrolytic capacitors were not tested.

The separator of Comparative Example 3 had a large core diameter, a high curvature rate, and a large thickness of 105 μm, and therefore had a high impedance.

The separators of Examples 4 and 5 had a core with an average fiber diameter of 10 and 9 μm after beating and had a thickness of 70 and 60 μm, a density of 0.33 and 0.35 g/cm³, and a curvature rate of 12 and 10, respectively. Both of the separators had no short circuit, and Example 5 had a lower impedance. Conventional Example 1 composed of 100% by mass of natural cellulose had a core with a large average fiber diameter and had a high curvature rate, and therefore had a very high impedance.

These results show that a separator for an aluminum electrolytic capacitor preferably has a core with an average fiber diameter in the range of 1 to 11 μm after beating and preferably has a thickness in the range of 5 to 100 μm, a density in the range of 0.25 to 0.9 g/cm³, and a curvature rate in the range of 1.5 to 15. More preferably, the separator has a core with an average fiber diameter in the range of 1.5 to 9 μm after beating and has a thickness in the range of 10 to 60 μm, a density in the range of 0.35 to 0.8 g/cm³, and a curvature rate in the range of 2.0 to 10.

The separator of Comparative Example 4, which contained 10% by mass of PET chemical fibers, had lower strength and lower denseness than 100% cellulose. Thus, the aluminum electrolytic capacitor had a short circuit rate of 1.1%.

The separator of Comparative Example 5 was composed of 90% by mass of lyocell and 10% by mass of natural cellulose esparto. Esparto originally has a small fiber diameter, is natural fiber and has lower rigidity than solvent-spun regenerated cellulose, and is therefore easily flatten by pressing in paper-making, though esparto is almost circular. Thus, although the separator of Comparative Example 5 had a satisfactory curvature rate and a satisfactory average fiber diameter of the core, the aluminum electrolytic capacitor had high impedance due to the large effects of the fiber diameter of esparto.

The separator of Conventional Example 2 produced with a cylinder paper machine had through-holes characteristic of the cylinder paper machine and therefore had a low curvature rate of 1.4 and an increased short circuit rate of 2.1%.

By contrast, the aluminum electrolytic capacitors including the separators of Examples 6 and 7 had low impedance and no short circuit.

Thus, a separator is preferably composed of 100% by mass of solvent-spun regenerated cellulose.

In Examples 8 to 10, the separators of the present embodiments were used in an electric double layer capacitor, a lithium ion capacitor, a lithium primary battery, and a lithium-ion secondary battery. The use of these separators caused no short circuit and resulted in lower internal resistance than Conventional Examples 3 to 5.

Conventional Examples 4 and 5 formed of polyolefin had low wettability by electrolytic solutions and had lower productivity of the lithium primary battery and the lithium-ion secondary battery than Examples 9 and 10.

Thus, the present embodiments can provide a separator that has a core with an average fiber diameter in the range of 1 to 11 μm after beating, contains 100% by mass of beatable solvent-spun regenerated cellulose, and has a curvature rate in the range of 1.5 to 15, a thickness in the range of 5 to 100 μm, and a density in the range of 0.25 to 0.9 g/cm³. The separator is not broken in an electrochemical device production process, has low resistance, is resistant to short circuits, and has high wettability by electrolytic solutions.

INDUSTRIAL APPLICABILITY

The separators of the present embodiments can be used in various electrochemical devices, such as aluminum electrolytic capacitors, electric double layer capacitors, lithium ion capacitors, lithium primary batteries, and lithium-ion secondary batteries, as well as sodium ion batteries and solid electrolytic capacitors.

REFERENCE SIGNS LIST 1 separator
2 core
3 fibril

The invention claimed is:

1. A separator for an electrochemical device, consisting of:
solvent-spun regenerated cellulose fibers,
wherein the solvent-spun regenerated cellulose fibers comprise having a core portion with an average fiber diameter of from 1 to 11 μm,
the separator has a thickness of from 5 to 100 μm, a density of from 0.25 to 0.9 g/cm³, a Gurley value of 1.5 to 30.1 s/100 ml, and a curvature rate of from 1.5 to 15, and
the separator is capable of holding an electrolytic solution containing an electrolyte.

2. The separator according to claim 1, having the Gurley value of 1.5 to 19.

3. The separator according to claim 1, having the Gurley value of 1.5 to 15.

4. The separator according to claim 1, which is free of natural cellulose fibers.

5. The separator according to claim 1, wherein the solvent-spun regenerated cellulose fibers comprise lyocell.

6. The separator according to claim 1, wherein the solvent-spun regenerated cellulose fibers further comprises a fibril with a fiber diameter of less than 1 μm.

7. An electrochemical device comprising the separator according to claim 1.

8. The electrochemical device according to claim 7, wherein the electrochemical device is an aluminum electrolytic capacitor, an electric double layer capacitor, a lithium ion capacitor, a lithium primary battery, or a lithium-ion secondary battery.

9. The electrochemical device according to claim 7, wherein the separator is interposed between a pair of electrodes.

* * * * *